United States Patent
Urakawa

(10) Patent No.: US 12,182,465 B2
(45) Date of Patent: *Dec. 31, 2024

(54) IMAGE FORMING APPARATUS THAT TRANSMITS REMOTE SCREEN DATA WITHOUT DISPLAYING AN APPROVAL SCREEN IN RESPONSE TO SATISFY A PARTICULAR CONDITION

(71) Applicant: BROTHER KOGYO KABUSHIKI KAISHA, Nagoya (JP)

(72) Inventor: Yutaka Urakawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,020

(22) Filed: Oct. 10, 2023

(65) Prior Publication Data

US 2024/0036789 A1 Feb. 1, 2024

Related U.S. Application Data

(63) Continuation of application No. 17/817,129, filed on Aug. 3, 2022, now Pat. No. 11,816,381.

(30) Foreign Application Priority Data

Sep. 29, 2021 (JP) .................... 2021-159410

(51) Int. Cl.
G06F 3/12 (2006.01)
H04L 9/40 (2022.01)
(Continued)

(52) U.S. Cl.
CPC .......... *G06F 3/1287* (2013.01); *G06F 3/1204* (2013.01); *G06F 3/1236* (2013.01);
(Continued)

(58) Field of Classification Search
None
See application file for complete search history.

(56) References Cited

U.S. PATENT DOCUMENTS 9,886,222 B2 2/2018 Sato et al.
10,346,106 B2 * 7/2019 Nakajima ............. G06F 3/1225
(Continued)

FOREIGN PATENT DOCUMENTS

JP 2003-223307 A 8/2003
JP 2020-10265 A 1/2020

OTHER PUBLICATIONS

Extended European Search Report dated Feb. 17, 2023 from related EP 22188640.

(Continued)

*Primary Examiner* — Haris Sabah
(74) *Attorney, Agent, or Firm* — Scully, Scott, Murphy & Presser, PC

(57) ABSTRACT

A controller performs an approval process of, in response to receiving a first request from a requesting apparatus via a communication interface, displaying an approval screen on a user interface. In response to receiving an approval operation to the approval screen via the user interface, the controller transmits remote screen data to the requesting apparatus. In response to determining that a particular condition is satisfied when the first request is received from the requesting apparatus via the communication interface, the controller transmits the remote screen data to the requesting apparatus without displaying the approval screen on the user interface. After transmitting the remote screen data, in response to receiving an instruction via the communication interface from the requesting apparatus, the controller perform a particular process based on the instruction.

13 Claims, 6 Drawing Sheets

(51) Int. Cl.
  *G06F 1/3209* (2019.01)
  *H04N 1/32* (2006.01)
(52) U.S. Cl.
  CPC .......... *H04L 63/101* (2013.01); *G06F 1/3209* (2013.01); *H04N 1/32662* (2013.01)

(56) References Cited

U.S. PATENT DOCUMENTS

| | | |
|---|---|---|
| 2015/0201094 A1 | 7/2015 | Iwase |
| 2016/0124686 A1 | 5/2016 | Maeda |
| 2016/0191726 A1 | 6/2016 | Yanase |
| 2017/0262234 A1 | 9/2017 | Tokunaga |
| 2017/0280003 A1 | 9/2017 | Haba et al. |
| 2018/0373466 A1 | 12/2018 | Takayama |
| 2019/0004749 A1 | 1/2019 | Nakajima et al. |
| 2021/0306488 A1* | 9/2021 | Okuno ............... H04N 1/00938 |

OTHER PUBLICATIONS

Notice of Allowance dated Jul. 12, 2023 from parent application U.S. Appl. No. 17/817,129.

* cited by examiner

IMAGE FORMING APPARATUS THAT TRANSMITS REMOTE SCREEN DATA WITHOUT DISPLAYING AN APPROVAL SCREEN IN RESPONSE TO SATISFY A PARTICULAR CONDITION

REFERENCE TO RELATED APPLICATIONS

This application is a continuation application of U.S. Ser. No. 17/817,129 filed on Aug. 3, 2022 which claims priority from Japanese Patent Application No. 2021-159410 filed on Sep. 29, 2021. The entire contents of each of the prior applications is incorporated herein by reference.

BACKGROUND ART

There is known a technique in which a remote screen that virtually shows a user interface of an image forming apparatus is displayed on a remote information processing apparatus, and the image forming apparatus is remotely controlled in response to an operation of the remote screen.

DESCRIPTION

In order to improve the security of the remote screen, the inventor considers a configuration of permitting the information processing apparatus to display the remote screen on condition that an approval operation is received via the user interface of the image forming apparatus.

According to one aspect, this specification discloses an image forming apparatus. The image forming apparatus includes a user interface, a communication interface, and a controller. The controller is configured to perform, in response to receiving a first request from an apparatus connected via the communication interface, displaying an approval screen on the user interface. Thus, the image forming apparatus receives the request from the requesting apparatus. The controller is configured to perform an approval process of, in response to receiving a first request from an apparatus connected via the communication interface, displaying an approval screen on the user interface, the apparatus having transmitted the first request being a requesting apparatus. Thus, the image forming apparatus displays the approval screen. The controller is configured to perform, in response to receiving an approval operation to the approval screen via the user interface, transmitting remote screen data to the requesting apparatus. The remote screen data being data for displaying a remote screen on the requesting apparatus. The first request is a request for displaying the remote screen. The remote screen is a screen displayed on the requesting apparatus. The remote screen is a screen that virtually displays the user interface. Thus, the image forming apparatus transmits the remote screen data based on the approval operation to the approval screen. The controller is configured to perform, in response to determining that a particular condition is satisfied when the first request is received from the requesting apparatus via the communication interface, transmitting the remote screen data to the requesting apparatus without displaying the approval screen on the user interface. Thus, the image forming apparatus transmits the remote screen data without displaying the approval screen on the user interface. The controller is configured to perform, after transmitting the remote screen data, in response to receiving an instruction via the communication interface from the requesting apparatus, perform a particular process based on the instruction. Thus, the image forming apparatus performs the particular process.

Figure 1:
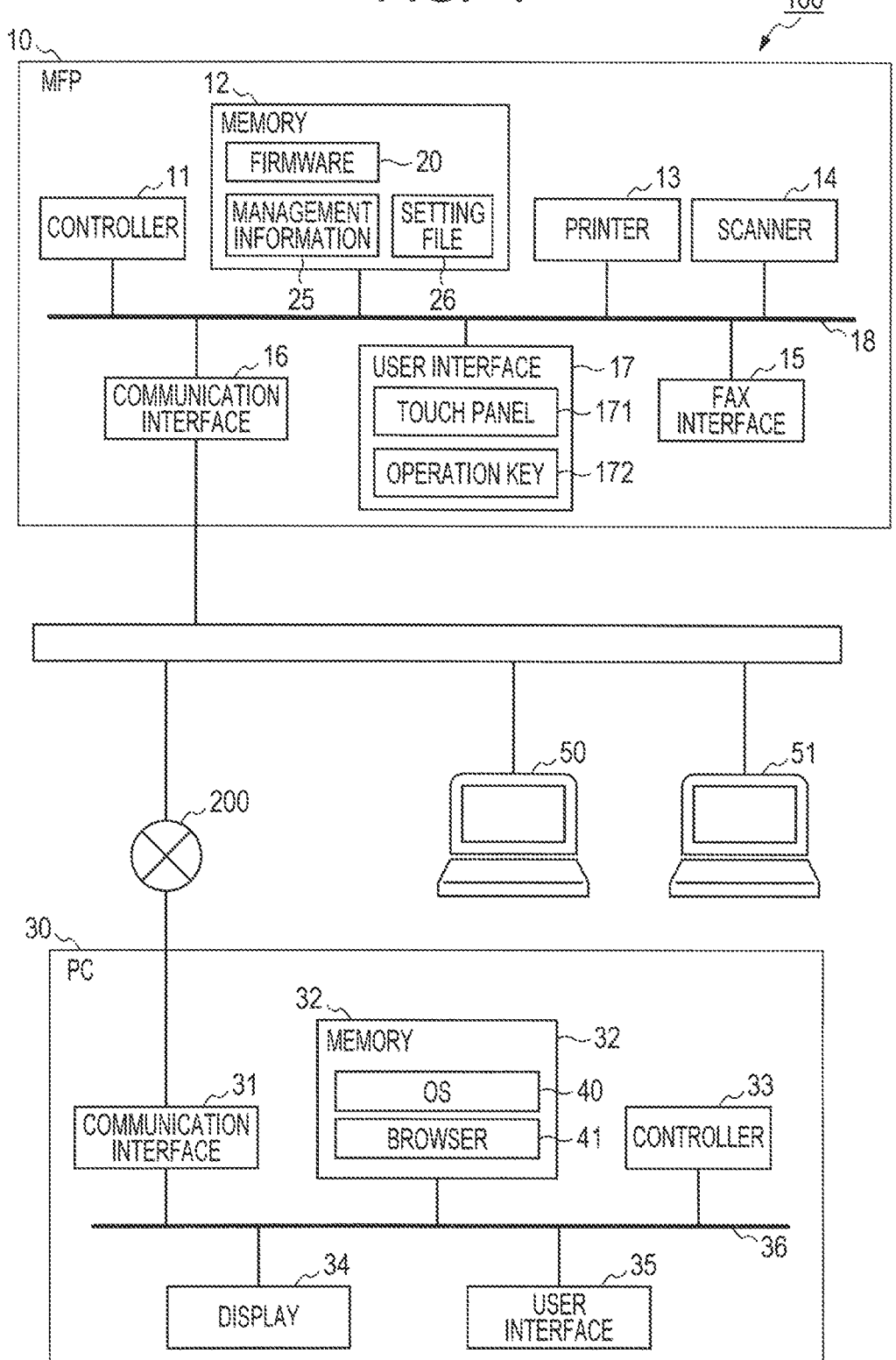
FIG. 1 is a diagram showing a configuration of an image forming system.

An image forming system 100 according to an embodiment will be described with reference to the drawings. The image forming system 100 shown in FIG. 1 includes an MFP 10 and PCs 30, 50, and 51. The MFP is an abbreviation for multifunction peripheral. The MFP 10 and the PCs 30, 50, and 51 are connected to a network 200 and communicate with each other through the network 200. The network 200 is a LAN or the Internet. In this embodiment, the MFP 100 is an example of an image forming apparatus. The PCs 30, 50, and 51 are examples of an information processing apparatus. The MFP 10 and the PCs 30, 50, and 51 are connected to the same LAN.

Next, the configuration of the MFP 10 will be described. The MFP 100 includes a controller 11, a memory 12, a printer 13, a scanner 14, a FAX interface 15, a communication interface 16, a user interface 17, and a bus 18. The "interface" may be abbreviated as "IF".

The communication interface 16 connects the MFP 10 to the network 200 in accordance with a particular communication protocol. The user interface 17 is an interface that exists between a user who directly operates the MFP 10 and the controller 11, and has, for example, a touch panel 171 and an operation key 172 which is a physical key.

The printer 13 executes a print operation of printing an image on a recording medium such as a sheet or a disk. As the recording method of the printer 13, an inkjet method, an electrophotographic method, and so on may be adopted. The scanner 14 executes a scan operation of reading an image recorded on a document and generating image data. The FAX interface 15 executes a FAX operation of transmitting and receiving image data in a method in accordance with the FAX protocol. The MFP 10 may be configured to execute a combined operation in which a plurality of operations are combined. A copy operation that combines the print operation by the printer 13 and the scan operation by the scanner 14 is an example of the combined operation.

The controller 11 includes a CPU, an ASIC (abbreviation of Application Specific Integrated Circuit), and so on, and controls the operations of the printer 13, the scanner 14, the FAX interface 15, the communication interface 16, and the user interface 17. The memory 12 includes a data storage area. The data storage area is an area for storing data and so on necessary for executing a program and so on. The memory 12 is configured by combining a RAM, a ROM, an SSD, an HDD, and so on. A buffer included in the controller 11 and used when executing various programs may also be regarded as a part of the memory 12. The memory 12 may be a storage medium that is readable by the controller 11. The storage medium that is readable by the controller 11 is a non-transitory medium. In addition to the above examples, the non-transitory medium also includes a recording medium such as a CD-ROM or a DVD-ROM. The non-transitory medium is also a tangible medium. On the other hand, an electric signal that carries a program downloaded from a server on the Internet and so on is a computer-readable signal medium, which is a kind of computer-readable medium, but is not included in a non-transitory computer-readable storage medium.

The memory 12 stores a firmware 20 as a program that is executable by the controller 11. In the following description, the controller 11 that executes a program may be simply described by the program name. For example, the description "the firmware" is used to mean "the controller 11 that executes the firmware 20". In this embodiment, the processes of the controller 11 according to instructions described in the program is mainly shown. That is, the processes such as "judgment", "extraction", "selection", "calculation", "determination", "identifying", "acquisition", "acceptance", and "control" in the following description are the processes of the controller 11. Note that "acquisition" is used as a concept that does not require a request. That is, the process of receiving data without request by the controller 11 is also included in the concept of "the controller 11 acquires data". The "data" in the present specification is represented by a bit array that is readable by the controller. Further, data having the same substantial meaning and contents but different formats are treated as the same data. The same goes for "information" in the present specification.

The firmware 20 also functions as a Web server for displaying a particular Web page on the PC 30. The firmware 20 provides remote screen control to the PC 30. The remote screen control is a function of causing the PC 30 to display a remote screen that represents the user interface 17 of the MFP 10 in a pseudo manner so that the MFP 10 is remotely controlled by operating the remote screen. The firmware 20 transmits Web page data for displaying the remote screen to the PC 30, thereby causing the remote screen to be displayed on a browser 41 described later of the PC 30.

Management information 25 is stored in the data storage area of the memory 12. In the management information 25, a login name and a password, which are authentication information, are stored in association with a PC configured to access the MFP 10.

Next, the configuration of the PC 30 will be described. The PC 30 includes a communication interface 31, a memory 32, a controller 33, a display 34, and a user interface 35. The communication interface 31, the memory 32, the controller 33, and the user interface 35 included in the PC 30 have similar configurations to the controller 11, the memory 12, the communication interface 16 and the user interface 17 included in the MFP 10, and the description thereof will be omitted.

An OS 40 and a browser 41 are stored in the memory 32. The browser 41 is a program that causes the controller 33 to display, on the display 34, an image corresponding to Web page data transmitted from the MFP 10. The PCs 50 and 51 have similar configuration to the PC 30, and the description thereof will be omitted.

Next, the procedure of the processes when remote screen control is executed by the PC 30 will be described with reference to FIG. 2. The MFP 10 displays an operation screen on the user interface 17, and changes display on the operation screen sequentially in response to an operation via the user interface 17, the operating status of the MFP 10, and so on. The process of changing the operation screen sequentially is performed in parallel with the processes in FIG. 2. The operation screen includes an under-execution screen indicating that a process such as printing or scanning is currently performed, an instruction screen for receiving an instruction for execution of copying, scanning, and so on, a setting screen for changing various types of settings, a status screen indicating the status of the MFP 10, an execution instruction screen, and a standby screen for waiting for an instruction for displaying the setting screen and so on, for example.

Figure 2:
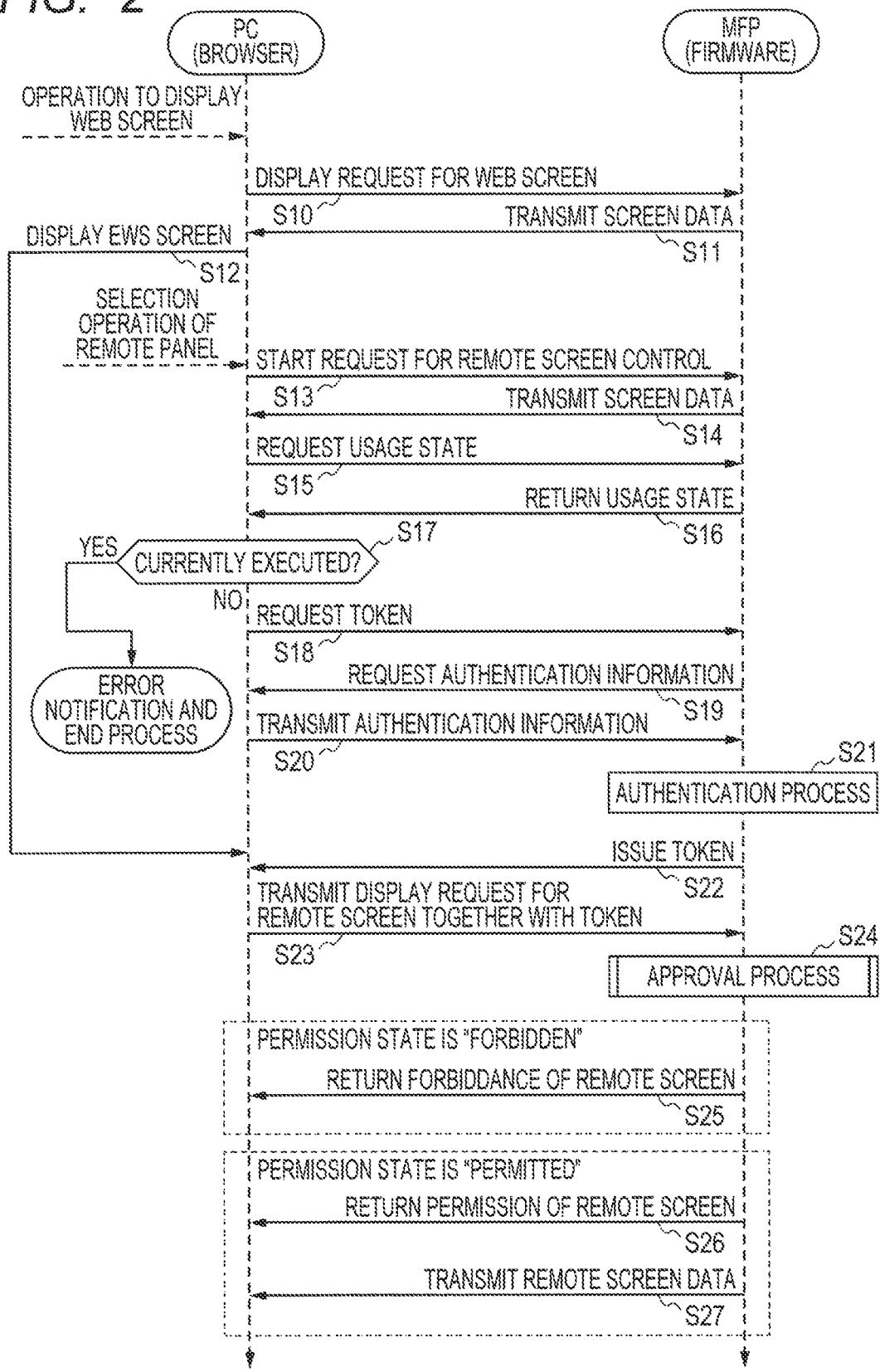
FIG. 2 is a timing chart illustrating a process relating to remote screen control.

In FIG. 2, in step 10 (hereinafter, a step is simply referred to as "S"), the browser 41 of the PC 30 transmits a request for Web page data to the MFP 10. The Web page data requested in S10 is Web page data for displaying a home screen when the firmware 20 functions as a Web server. For example, in response to receiving an input of a URL specifying the firmware 20 by the user, the browser 41 transmits a request to the firmware 20. The communication between the browser 41 and the firmware 20 is performed in accordance with the http(s) protocol.

In S11, the firmware 20 transmits the Web page data (screen data) to the PC 30. In response to receiving the Web page data, in S12, the browser 41 displays a Web page indicated by the received Web page data on the display 34. In the present embodiment, the browser 41 displays a home screen on the display 34 by receiving the Web page data.

Figure 3:
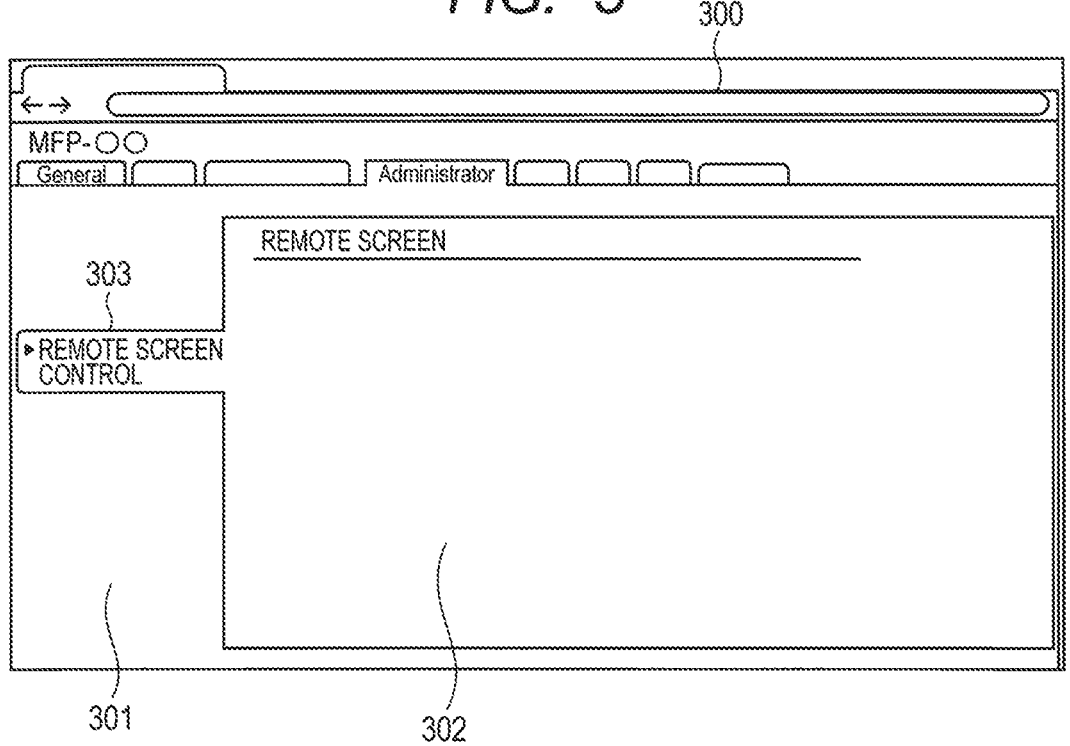
FIG. 3 is a diagram illustrating an administrator screen.

When a login operation to the MFP 10 is performed on the home screen, the browser 41 transmits a login password and so on to the firmware 20. In response to receiving a response to the login permission from the firmware 20 (EWS), the browser 41 causes the display 34 of the PC 30 to display an administrator screen 300 shown in FIG. 3. The administrator screen 300 includes an item display area 301 and a function display area 302.

In response to receiving, via the user interface 35, a selection operation of an item 303 of "remote screen control" included in the item display area 301, in S13 the browser 41 transmits, to the MFP 10, a start request for remote screen control. In response to receiving a start request for the remote screen control, in S14 the firmware 20 transmits Web page data for updating the Web page. This Web page data includes an execution program configured to be interpreted by the browser 41. The execution program is a script program such as Javascript, for example.

In S15, by executing the execution program, the browser 41 transmits, to the MFP 10, a request for a current usage state of the remote screen control. The usage state of the remote screen control is information indicating whether the remote screen control targeting another apparatus such as the PC 50 is currently executed, and in the present embodiment, it is either "currently executed" or "not executed". When the information indicating a permission state is stored in the memory 12, the firmware 20 returns information indicating "currently executed". When the information indicating the permission state is not stored in the memory 12, the firmware 20 returns information indicating "not executed".

In S16, the firmware 20 returns the usage state of the remote screen control to the PC In S17, the browser 41 determines the usage state returned from the firmware 20. Specifically, in response to determining that the usage state of the remote screen control indicates "currently executed" (YES in S17), the browser 41 outputs an error notification and ends the process of FIG. 2. In this case, execution of remote screen control is not permitted. For example, a text image indicating that remote screen control targeting another apparatus is currently executed and remote screen control targeting the own apparatus cannot be executed is displayed on the Web page. In this case, the browser 41 continues displaying the home screen in S12.

Figure 4:
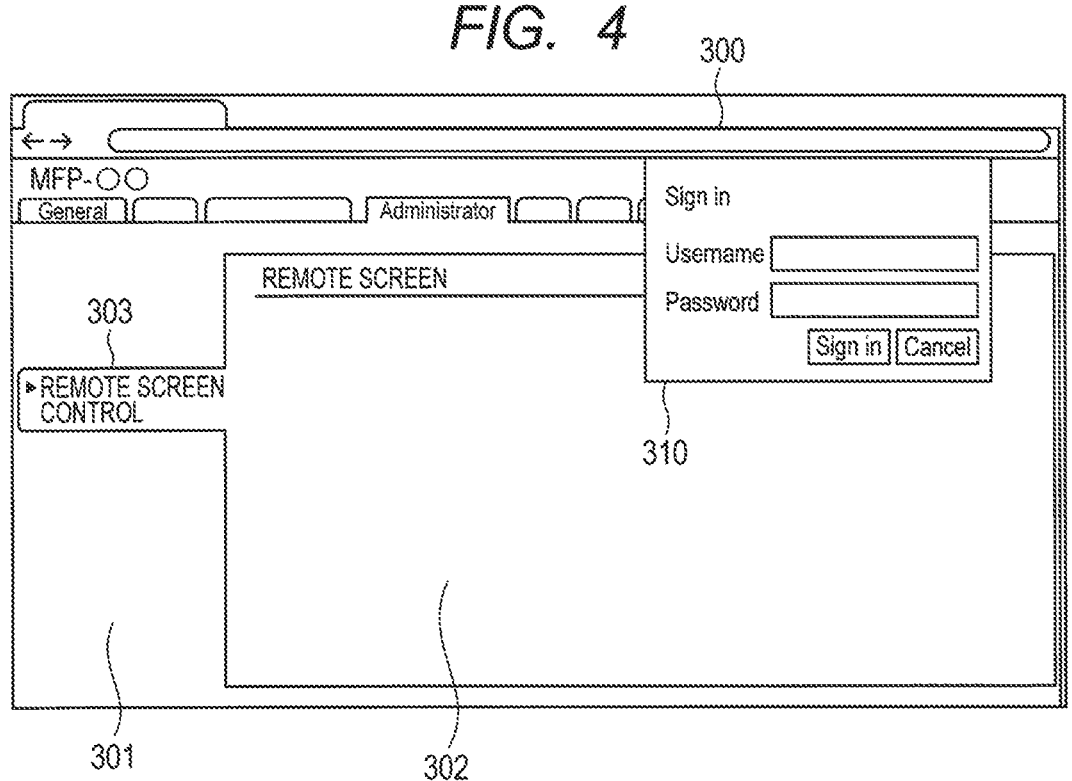
FIG. 4 is a diagram illustrating an administrator screen.

In response to determining that the information indicating the usage state of the remote screen control indicates "not executed" (NO in S17), in S18 the browser 41 requests the MFP 10 to issue a token. The token is information for authenticating an apparatus that executes remote screen control, and in the present embodiment, the token is a one-time token created based on the authentication information. In response to receiving a request for issuing a token, in S19 the firmware 20 transmits a request for authentication information to the PC 30. Specifically, the firmware 20 transmits, to the browser 41, data for displaying a login form for receiving input of authentication information. The browser 41 displays the administrator screen 300 on which a login form 310 shown in FIG. 4 is superimposed, based on the transmitted data. In S20, the browser 41 transmits, to the MFP 10, the authentication information (that is, user name and password) entered via the login form 310.

In response to receiving the authentication information, in S21 the firmware 20 performs an authentication process for determining whether the user indicated by the received authentication information is a user who is permitted to execute the remote screen control. In the authentication process, the firmware 20 determines whether the authentication information of the user (for example, the administrator) stored in the management information 25 stored in the memory 12 matches the authentication information transmitted from the browser 41. If both the authentication information do not match, the firmware 20 transmits a response to refuse the transmission of the token to the browser 41, and ends the process of FIG. 2.

If the authentication is successful, in S22 the firmware 20 issues a token to the PC 30. At this time, in a case where the information indicating that the token has been issued is stored in the memory 12, the firmware 20 may determine that the token has been issued without transmitting the token. In response to receiving the token issued by the MFP 10, in S23 the browser 41 transmits a request for displaying the remote screen together with the issued token. In response to receiving the request for displaying the remote screen from the browser 41, in S24 the firmware 20 performs an approval process. In the present embodiment, the request for displaying the remote screen transmitted by the browser 41 in S23 is an example of a first request.

Figure 5:
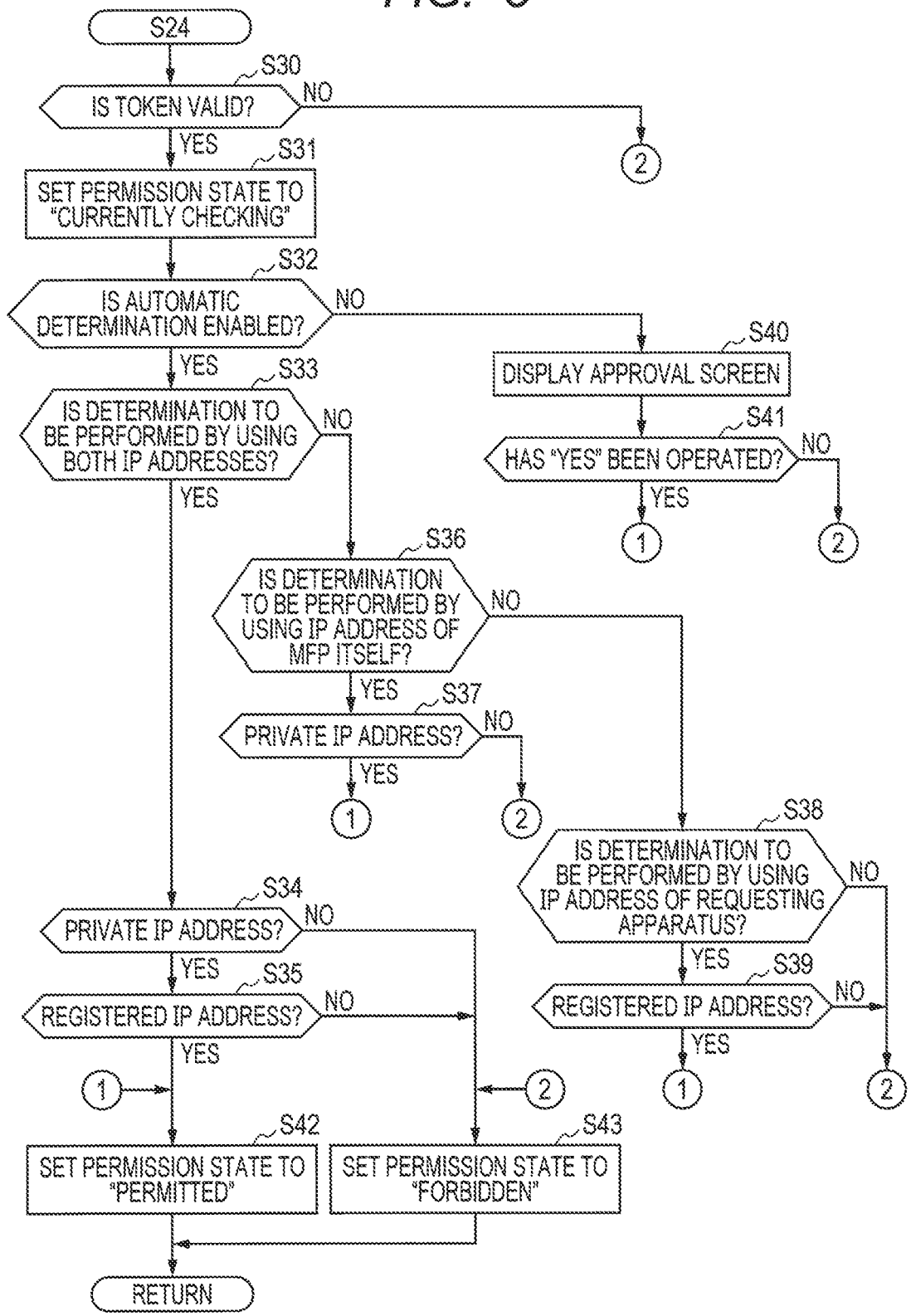
FIG. 5 is a flowchart illustrating a process of S24 in FIG. 2.

FIG. 5 is a flowchart illustrating the approval process executed in S24, and the subject is the firmware 20. In S30, the firmware 20 determines whether the token transmitted from the PC 30 together with the remote screen display request is valid. Specifically, the firmware 20 determines that the token is not valid when too much time has passed after the token was issued, or when the token is forged. If the firmware 20 determines that the transmitted token is not valid, the firmware 20 proceeds to S43 and sets the permission state to "forbidden". When S43 is finished, the process proceeds to S25 in FIG. 2.

When the firmware 20 determines that the token transmitted from the PC 30 is valid, a positive determination is made in S30, the process proceeds to S31, and the permission state is set to "currently checking".

In S32, the firmware 20 determines whether the automatic determination is set to enabled. The automatic determination is a process of determining whether to permit the PC 30 to display the remote screen, using the IP address used for the communication between the MFP and the PC 30. Specifically, by referring to the setting item of the setting file 26 stored in the memory 12, the firmware 20 determines whether the automatic determination is enabled or disabled and whether the determination content of the automatic determination is enabled or disabled. The contents of the setting items of the setting file 26 may be updated by a process for updating the setting file 26 described later.

Figure 6:
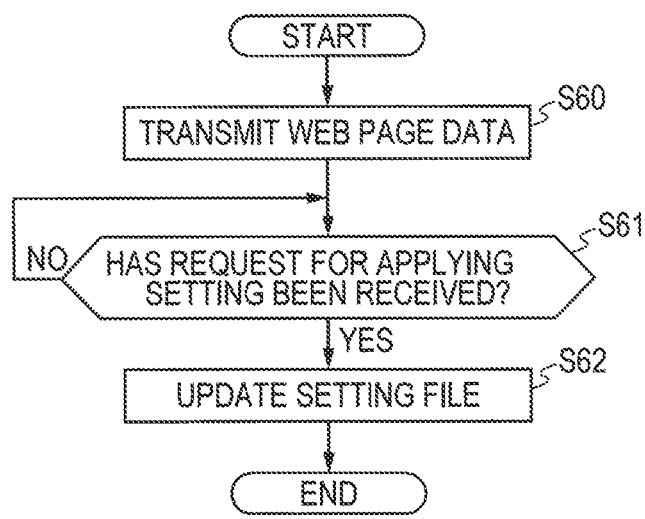
FIG. 6 is a flowchart illustrating a process relating to update of a setting file.

The process of updating the setting file 26 in which various setting items for automatic determination are stored will be described. FIG. 6 is a process executed by the controller 11 when the user gives an instruction to update a setting item in the approval process on the administrator screen 300, which is a Web page displayed on the PC 51. The PC 51 is a PC managed by an administrator like the PC 30.

Figure 7:
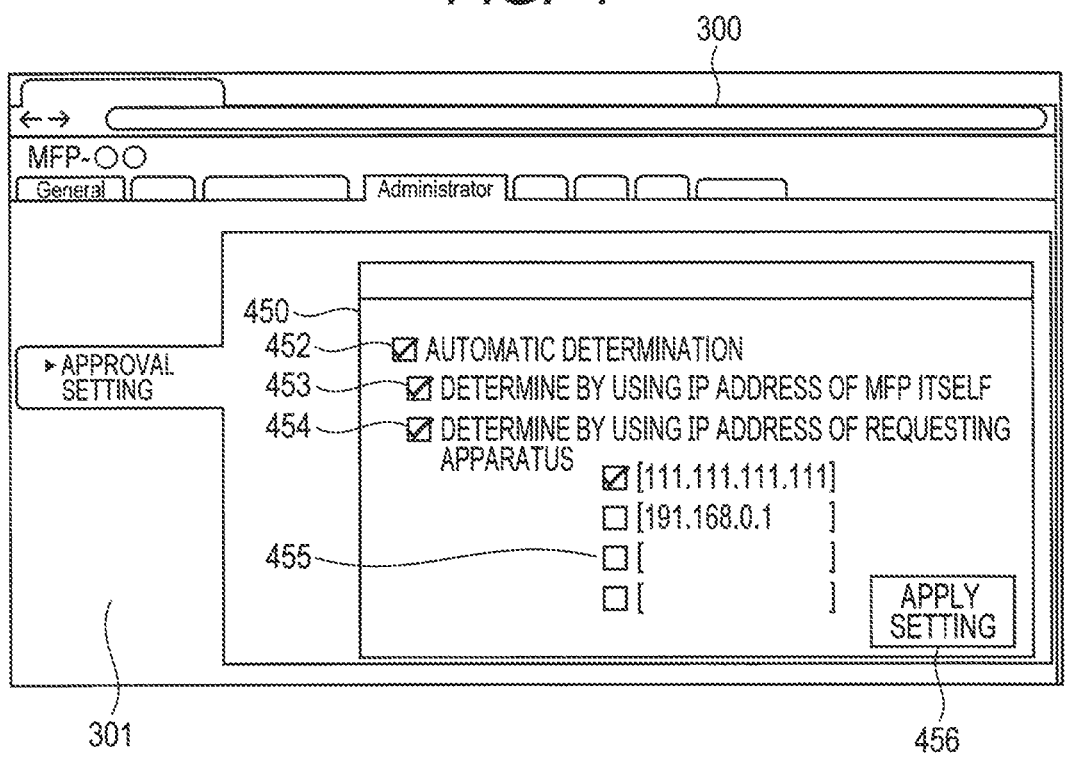
FIG. 7 is a diagram illustrating a setting screen.

In S60, the Web page data is transmitted to the PC 51, whereby a setting screen 450 shown in FIG. 7 is displayed on the PC 51. Specifically, when the firmware 20 of the MFP 10 receives, via the communication interface 16, an instruction that an operation of selecting "approval setting" in the item display area 301 has been received on the administrator screen 300 shown in FIG. 3 displayed on the PC 51, the firmware 20 causes the PC 51 to transmit the Web page data. In this case, too, the same authentication as in S19 to S21 is performed between the firmware 20 of the MFP 10 and the browser 41 of the PC 51, and when the authentication of S21 is successful, the firmware 20 transmits the Web page data relating to the approval setting.

The setting screen 450 included in the administrator screen 300 is a screen for receiving an enable/disable setting which is a setting item in the automatic determination and an operation of specifying enable/disable which is a setting item of each determination content. The setting screen 450 includes check boxes 452, 453, and 454, an address form 455, and a setting apply button 456.

When the check box 452 is checked, it means that the setting file 26 has received an instruction that the setting item of the automatic determination is enabled. In this state, the check boxes 453 and 454 can be checked. In a state where the check box 452 is not checked, the check boxes 453 and 454 are disabled. When only the check box 453 is checked, it means that the setting file 26 has received an instruction that the setting item of "determine by using the IP address of the MFP itself" is enabled. When only the check box 454 is checked, it means that the setting file 26 has received an instruction that the setting item of "determine by using the IP address of the requesting apparatus" is enabled. When both the check boxes 453 and 454 are checked, it means that the setting file 26 has received an instruction that both the setting items are enabled.

In the present embodiment, when the check box 452 is checked, at least one of the check boxes 453 and 454 is always checked. Specifically, in a state where only the check box 453 is checked, an unchecking operation for the check box 453 is not accepted. In a state where only the check box 454 is checked, an unchecking operation for the check box 454 is not accepted. Alternatively, when an unchecking operation is received via the user interface 17 in a state where one of the check boxes 453 and 454 is checked, the other one of the check boxes 453 and 454 may be automatically checked.

When the check box 454 is checked and the setting item of "determine by using the IP address of the requesting apparatus" is enabled, an IP address can be input to the address form 455 by the received operation.

In S61, the firmware 20 determines whether a request for applying setting has been received from the PC 51 via the communication interface 16. Specifically, when the setting apply button 456 is operated on the setting screen 450 displayed on the PC 51, the PC 51 transmits the request for applying setting to the MFP 10. At this time, the PC 51 transmits an instruction for the setting item corresponding to the operation received on the setting screen 450 to the MFP 10 via the communication interface 16, together with the request for applying setting. If a positive determination is made in S61, the process proceeds to S62.

In S62, the firmware 20 updates each setting item of the setting file 26 in accordance with the instruction for the setting item transmitted from the PC 51 together with the request for applying setting. In response to receiving an enable instruction of automatic determination by the check of the check box 452, the setting item of automatic determination stored in the setting file 26 is set to "enabled". In response to receiving an enable instruction of "determine by using the IP address of the MFP itself", which is a determination content, by the check of the check box 453, the setting item of "determine by using the IP address of the MFP itself" stored in the setting file 26 is set to "enabled". In response to receiving an enable instruction of "determine by using the IP address of the requesting apparatus" by the check of the check box 454, the setting item of "determine by using the IP address of the requesting apparatus" stored in the setting file 26 is set to "enabled".

The update of the setting items of the setting file 26 is also executed by operations on the user interface 17 of the MFP 10. Specifically, the controller 11 of the MFP 10 controls the user interface 17 to display the setting screen shown in FIG. 7 in accordance with an operation on the user interface 17. In this case, the firmware 20 of the MFP 10 updates the setting file 26 based on the instruction for the setting item of the automatic determination received on the setting screen. Specifically, the firmware 20 receives instructions on an enable/disable setting, a determination content, and a registered IP address, which are setting items for automatic determination.

Alternatively, in response to receiving an update instruction for the setting item of the setting file 26 from the PC 30, 50, or 51 connected to the network 200 via the communication interface 16, the firmware 20 of the MFP 10 may update the setting file 26 in accordance with the received update instruction.

Returning to FIG. 5, if the automatic determination is enabled in the setting file 26 and a positive determination is made in S32, the process proceeds to S33, and the firmware 20 determines whether determination is to be performed by using both the IP addresses of the PC 30, which is the requesting apparatus, and the MFP 10 which is the destination apparatus of the request, by referring to the setting file 26.

If a positive determination is made in S33, the process proceeds to S34, and the firmware 20 determines whether the IP address of the MFP 10 itself is a private IP address. The IP address of the MFP 10 itself is specifically the IP address of the MFP 10 used as the IP address of the destination of the request from the requesting apparatus. The IP address of the MFP 10 used as the destination address of the request from the requesting apparatus is an example of the IP address used for communication. If the IP address of the MFP 10 itself is a private IP address, the access is within the LAN and thus there is a low possibility that the security will be reduced even if the remote screen is permitted to be displayed. In the present embodiment, it is an example of a particular condition that the IP address of the MFP 10 itself is a private IP address.

If a positive determination is made in S34, the process proceeds to S35, and the firmware 20 determines whether the IP address of the requesting apparatus is a registered address. The IP address of the requesting apparatus is an IP address used as the requester address when the requesting apparatus transmits data to the MFP 10. The IP address of the requesting apparatus is an IP address used as a destination when the MFP 10 transmits data to the requesting apparatus. That is, the IP address of the requesting apparatus is an example of the IP address used for communication. The registered address is an IP address registered in advance in the setting file 26 stored in the memory 12. If the IP address is registered in advance in the setting file 26, there is a low possibility that the security will be reduced even if the remote screen is permitted to be displayed. In the present embodiment, it is an example of a particular condition that the IP address of the requesting apparatus is a registered address.

If a positive determination is made in S35, the process proceeds to S42 and the permission state is set to "permitted". Specifically, the firmware 20 stores information indicating the permission state in the memory 12. The information indicating the permission state is information indicating either "permitted" or "forbidden". If a negative determination is made in S34 or S35, the process proceeds to S43 and the permission state is set to "forbidden". When the remote screen control ends, the firmware 20 erases the information (permitted, forbidden) indicating the permission state stored in the memory 12.

In S33, if the determination based on both addresses is not set in the setting file 26 as the determination content of the automatic determination, the process proceeds to S36, and the firmware 20 determines whether "determine by using the IP address of the MFP itself" is set in the setting file 26 as the determination content of automatic determination. If "determine by using the IP address of the MFP itself" is set in the setting file 26, a positive determination is made in S36.

If a positive determination is made in S36, the process proceeds to S37, and the same determination as in S34 is made. If a positive determination is made in S37, the process proceeds to S42 and the permission state is set to "permitted". If a negative determination is made in S37, the process proceeds to S43 and the permission state is set to "forbidden".

If "determine by using the IP address of the MFP itself" is not set in the setting file 26 as the determination content of the automatic determination, and a negative determination is made in S36, the process proceeds to S38. In S38, the firmware 20 determines whether "determine by the IP address of the requesting apparatus" is set in the setting file 26 as the determination content of the automatic determination. If a positive determination is made in S38, the process proceeds to S39 and the same determination as in S35 is made. If a positive determination is made in S39, the process proceeds to S42 and the permission state is set to "permitted". If a negative determination is made in S38 or S39, the process proceeds to S43 and the permission state is set to "forbidden". In S31 to S39, S42 and S43, the approval performed by the firmware 20 using the IP address for communication is an example of a first approval process.

In S32, if the automatic determination is set to disabled in the setting file 26, the process proceeds to S40. In S40, approval is performed using an approval screen 400. The approval using the approval screen 400 is a process of approving the display of the remote screen in response to receiving an approval operation on the approval screen displayed on the user interface 17.

Figure 8:
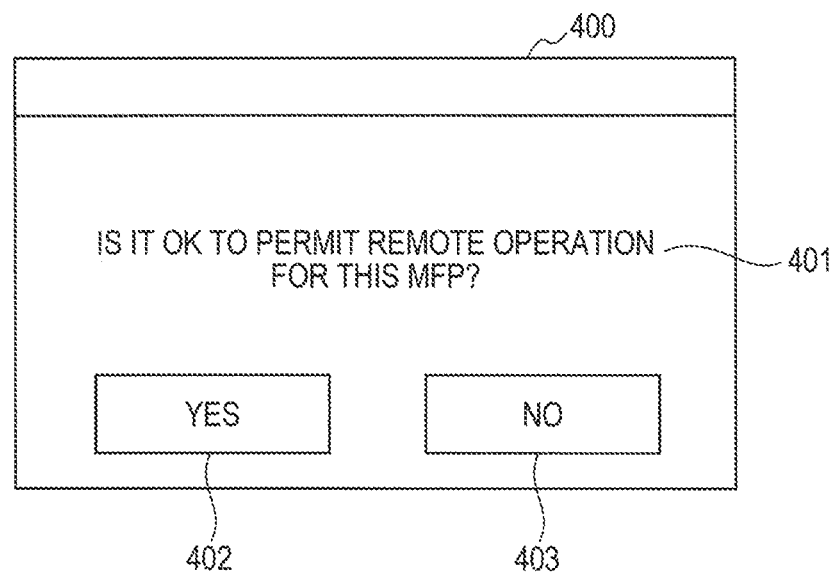
FIG. 8 is a diagram illustrating an approval screen.

As shown in FIG. 8, the approval screen 400 includes a text image 401, a permit button 402, and a forbid (reject)

button 403. The text image 401 is an image displaying a text prompting a user near the MFP 10 to perform an approval operation because there is a request to display a remote screen.

When the user near the MFP 10 operates the permit button 402 as an approval operation, a positive determination is made in S41 and the process proceeds to S42. In S42, the permission state is set to "permitted". When the user near the MFP 10 operates the forbid button 403 as an approval operation, a negative determination is made in S41 and the process proceeds to S43. In S43, the permission state is set to "forbidden". If the approval operation is not performed after a particular period has elapsed after the approval screen 400 is displayed in S40, the process may proceed to S43 and the permission state may be set to "forbidden". In the present embodiment, the approval performed by the firmware 20 using the approval screen in S40 to S43 is an example of a second approval process.

Returning to FIG. 2, in S25, when the permission state is set to "forbidden", the firmware 20 responds to the PC 30 that the transmission of the remote screen is forbidden. When the browser 41 receives a forbiddance response from the MFP 10, the browser 41 may display a forbiddance screen on the administrator screen 300. As a result, the user of the PC 30 determines by viewing the text image displayed on the display 34 that the transmission of the remote screen is forbidden by the MFP 10.

In S26, when the permission state is set to "permitted", the firmware 20 responds to the PC 30 that the transmission of the remote screen is permitted. In S27, the firmware 20 transmits remote screen data for displaying the remote screen on the browser 41 to the PC 30. In the present embodiment, the remote screen data is data that includes data indicating an operation screen currently displayed on the user interface 17. Specifically, the remote screen data includes, in addition to the data indicating the operation screen, the data indicating the operation key 172 which is the physical key of the user interface 17 and the data indicating an end button (reference numeral 333 in FIG. 9) described later. The firmware 20 creates remote screen data and transmits the created remote screen data to the browser 41. In the browser 41, the execution program included in the remote screen data interprets the remote screen data so that the display 34 displays the remote screen. In the present embodiment, the process executed by the firmware in S27 is an example of a transmission process. Alternatively, in response to receiving the display permission response in S26, the browser 41 may transmit a request for remote screen data to the MFP 10 again, and the firmware 20 may transmit the remote screen data to the PC 30 in S27 upon receiving this request.

Figure 9:
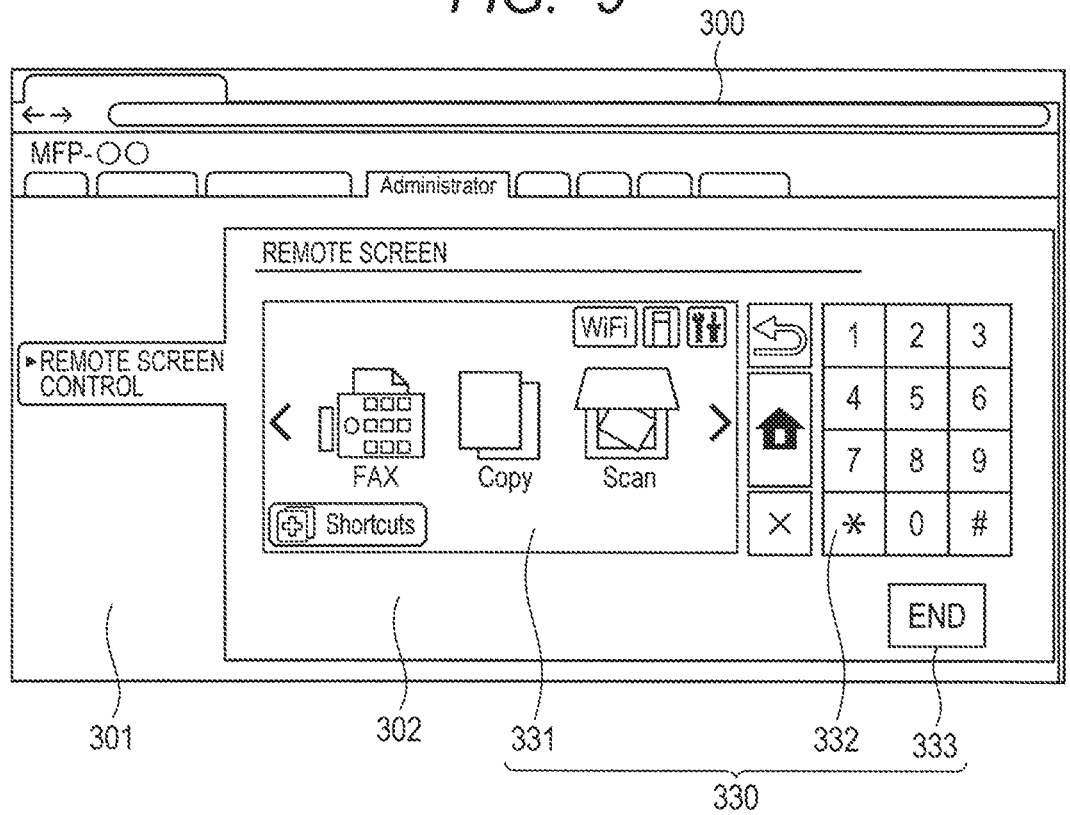
FIG. 9 is a diagram illustrating a remote screen.

FIG. 9 is a diagram showing an example in which a standby screen is displayed on the remote screen when the standby screen is displayed on the user interface 17. The remote screen 330 is displayed in the function display area 302 on the administrator screen 300. The remote screen 330 includes a screen display area 331 and an operation key display area 332. In the screen display area 331, the same screen as the operation screen currently displayed on the user interface 17 of the MFP 10 is displayed. In FIG. 9, as an example, a standby screen is displayed in the screen display area 331. In the operation key display area 332, an icon image of an operation key similar to the physical key of the user interface 17 is displayed. When a virtual operation on the user interface 17 has been performed on the remote screen 330, the information indicating the virtual operation is interpreted by the execution program included in the remote screen data, and is transmitted to the MFP 10. In response to receiving the information indicating that the virtual operation has been performed, the MFP 10 executes the process in accordance with the operation in the same manner as when the operation screen displayed on the user interface 17 is operated. For example, in response to receiving, from the PC 30, information indicating an operation on a Copy button on the remote screen 330, the MFP 10 executes a copy process including the display of a copy execution screen. For example, in response to receiving, from the PC 30, information indicating an operation on a setting button on the remote screen 330, the MFP 10 executes a process for setting the parameters of the MFP 10, including the display of a setting screen.

The data indicating the operation screen, the operation key, and the end button included in the remote screen data for displaying the remote screen 330 may be in the same data format such as raster data, or may be in any other data format. The data indicating the operation screen, the operation key, and the end button may be in different data formats. The firmware 20 may transmit only the data indicating the operation screen as the remote screen data to the browser 41, and the browser 41 may display the remote screen so that the data indicating the operation key and the end button is superimposed on the remote screen data by interpreting the execution program. Alternatively, the firmware 20 may transmit data indicating the operation screen and the operation key as remote screen data to the browser 41, and the browser 41 may superimpose the data indicating the end button on the remote screen data by interpreting the execution program. Further, the firmware 20 may transmit the Web page data for displaying the entire administrator screen including the remote screen data to the browser 41 instead of transmitting the remote screen data to the browser 41.

By executing the execution program, the browser 41 periodically transmits, to the firmware 20, a request for remote screen data for displaying the remote screen, and applies (reflects) the screen currently displayed on the user interface 17 to the remote screen. For example, when the browser 41 receives an operation input on the remote screen 330 via the user interface 35, the browser 41 transmits a request corresponding to the received operation input to the firmware 20 by executing the execution program. At this time, the browser 41 transmits the token issued by the firmware 20 together with the request corresponding to the operation input. For example, when the operation input on the remote screen 330 is an operation relating to screen update, the browser 41 transmits, to the firmware 20, a request for remote screen data for displaying the updated remote screen together with the token. In response to receiving the request for the remote screen data, the firmware 20 creates the remote screen data for displaying the updated remote screen 330 on the condition that the token is valid, and transmits the remote screen data to the browser 41.

The remote screen 330 displayed on the display 34 of the PC 30 is also updated when the user interface 17 of the MFP 10 is operated. In this case, when the firmware 20 receives a screen change operation via the user interface 17, the firmware 20 may transmit the remote screen data relating to the updated remote screen to the browser 41 without waiting for a request from the execution program.

The remote screen 330 includes the end button 333. When an operation input on the end button 333 by the user is received, the browser 41 transmits, to the firmware 20, a request for ending the remote screen control together with the token. When the firmware 20 receives the end request from the PC, the firmware 20 ends the remote screen control on condition that the token is valid. The firmware 20 ends the remote screen control. The process of ending the remote screen control includes deleting various information stored in the memory 12, such as information indicating the usage state of the remote screen control, information indicating that a token has been issued, and information indicating the permission state of the remote screen control. The firmware 20 may delete these information and then end the remote screen control, or another program may delete these information triggered by the end of the remote screen control. Also, in a case where there is no access from the browser 41 that executes the execution program for a certain time after the remote screen control is started, the firmware 20 ends the remote screen control in the same manner as when the end button is pressed.

In the present embodiment described above, the following effects are obtained.

In response to determining in the approval process that the IP address satisfies the particular condition, the controller 11 of the MFP 10 approves the display of the remote screen 330 for the PC 30 without displaying the approval screen on the user interface 17. This enables starting remote display control without performing an approval operation on the user interface 17. This suppresses the inconvenience of the operation when starting the remote control while suppressing the deterioration in security for the remote operation using the remote screen 330.

If the IP address of the MFP 10 used for communication with the requesting apparatus is a private address, the controller 11 approves transmission of the remote screen data without performing approval using the approval screen. Communication using a private address is communication with an apparatus in the LAN to which the MFP 10 is connected, and it is expected that security will be ensured by the administrator of the LAN, so approval using the approval screen may be omitted.

If the IP address of the PC 30 matches the IP address registered in the MFP 10, the controller 11 determines that the particular condition is satisfied. If the request is from the requesting apparatus having a reliable IP address registered in advance in the MFP 10 by the administrator, the transmission of the remote screen data may be automatically approved.

The controller 11 receives, via the user interface 17, designation of an IP address to be permitted in the approval process. That is, the usability of the approval process is improved.

If the IP address of the MFP 10 and the IP address of the PC 30 are addresses on the same LAN, the controller approves the transmission of the remote screen data without performing the approval using the approval screen. If the MFP 10 and PC 30 are connected to the same LAN and the MFP 10 and PC 30 are apparatuses managed by the same administrator who manages the LAN, it is expected that security will be ensured by the administrator, so the approval using the approval screen may be omitted.

Based on an operation received via the user interface 17, the controller 11 performs, for the MFP 10, a setting relating to enabling/disabling of the approval process using the automatic determination. In this way, the setting of whether to perform the approval process using the automatic determination is changed by the operation via the user interface 17. That is, a suitable approval process is executed depending on the situation in which the MFP 10 is used.

<Modifications>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, in S32 of FIG. 5, in response to determining that the automatic determination is disabled, the process proceeds to S40 and approval is performed using the approval screen 400. Alternatively, in response to determining that the automatic determination is disabled, the process may proceed to S43 to set the permission state to "forbidden". In this case, in response to determining that the automatic determination is enabled and in response to determining that the IP address used for communication satisfies the particular condition, the firmware 20 approves the display of the remote screen for the PC 30. In response to determining that the IP address used for communication does not satisfy the particular condition, the firmware 20 does not approve the display of the remote screen for the PC 30. In this modification, the processes of S40 and S41 are omitted. Further, the processes of S32, S40 and S41 may be omitted.

In the above-described embodiment, in the automatic determination, when the IP address of the MFP 10 is a private IP address (YES in S34) and the IP address of the requesting apparatus is a registered address (YES in S35), the firmware 20 proceeds to S42 and sets the permission state to "permitted". Alternatively, when both IP addresses used for communication are private IP addresses (YES in a process similar to S34), the controller 11 may proceed to S42 and set the permission state to "permitted". That is, after the process similar to S34, it is not determined whether the IP address is a registered address. In this case, the process of S35 is omitted.

If at least one of both IP addresses used for communication is not a private IP address (NO in a process similar to S34), the process may proceed to S35 to determine whether the IP address of the requesting apparatus is a registered address. In this case, if the IP address of the requesting apparatus is a registered address, a positive determination is made in S35, the process proceeds to S42, and the permission state is set to "permitted". If the IP address of the requesting apparatus is not a registered address, a negative determination is made in S35, the process proceeds to S43, and the permission state is set to "forbidden".

The order of determining whether the IP address is a private IP address in S34 and determining whether the IP address is a registered address in S35 may be switched. In this case, if the IP address of the requesting apparatus is a registered address in S35 (YES in S35), the process proceeds to S34, and the firmware 20 determines whether the IP address of the MFP 10 is a private IP address. If a positive determination is made in S34, the process proceeds to S42. If a negative determination is made in S34, the process proceeds to S43.

In a case where the determination of S34 and the determination of S35 are switched, the process may proceed to S42 if a positive determination is made in S35, and the process may proceed to S43 if a negative determination is made in S35. In this case, the process of S34 is omitted.

In the above-described embodiment, when the check box 452 is checked, at least one of the check boxes 453 and 454 is always checked, due to the design of the user interface shown in FIG. 7. However, another user interface may allow a state in which the item "automatic determination" is enabled, the item "determine by using the IP address of the MFP itself" is disabled, and the item "determine by using the IP address of the requesting apparatus" is disabled. In this case, in FIG. 5, a positive determination is made in S32, a negative determination is made in S36, and a negative determination is made in S38 (S32:Yes, S36:No, S38:No). The user interfaces other than the user interface in FIG. 7 include an application installed on the PC, an operation panel (the touch panel 171) of the MFP 10, and so on.

In the above-described embodiment, the MFP 10 has been described as an example of the image forming apparatus, but the image forming apparatus may be a printer, a scanner, or a copier. Further, the PC has been described as an example of the information processing apparatus, but the information processing apparatus may be a mobile terminal such as a smartphone.

What is claimed is:

1. An image forming apparatus comprising:
    a user interface;
    a communication interface; and
    a controller configured to:
        perform an approval process of:
            in response to receiving a first request from an apparatus connected via the communication interface, displaying an approval screen on the user interface, the apparatus having transmitted the first request being a requesting apparatus;
            in response to receiving an approval operation to the approval screen via the user interface, transmitting remote screen data to the requesting apparatus, the remote screen data being data for displaying a remote screen on the requesting apparatus, the first request being a request for displaying the remote screen, the remote screen being a screen displayed on the requesting apparatus, the remote screen being a screen that virtually displays the user interface; and
            in response to determining that a particular condition is satisfied when the first request is received from the requesting apparatus via the communication interface, transmitting the remote screen data to the requesting apparatus without displaying the approval screen on the user interface; and
        after transmitting the remote screen data, in response to receiving an instruction via the communication interface from the requesting apparatus, perform a particular process based on the instruction.

2. The image forming apparatus according to claim 1, further comprising a Web server,
    wherein the controller is configured to:
        in response to receiving a display request for a Web page relating to the image forming apparatus, control the Web server to transmit Web page data to an apparatus having transmitted the display request, the Web page data being data for allowing the apparatus having transmitted the display request to display the Web page; and
        after transmitting the Web page data, in response to receiving, via the Web page, the first request from the apparatus having transmitted the display request, perform the approval process by using a communication address used for communication with the apparatus having transmitted the display request, the apparatus having transmitted the display request being the requesting apparatus.

3. The image forming apparatus according to claim 1, wherein the user interface includes a touch panel and an operation key; and
    wherein the remote screen is a screen that virtually displays the user interface including the touch panel and the operation key.

4. The image forming apparatus according to claim 1, wherein the controller is configured to:
    in response to determining that information transmitted from the requesting apparatus satisfies the particular condition when the first request is received from the requesting apparatus via the communication interface, transmit the remote screen data to the requesting apparatus without displaying the approval screen on the user interface.

5. The image forming apparatus according to claim 1, wherein a memory of the image forming apparatus is configured to store setting information relating to the particular condition; and
    wherein the controller is configured to:
        in response to receiving the first request from the requesting apparatus via the communication interface in a state where the memory stores the setting information relating to the particular condition, determine whether the particular condition is satisfied based on the setting information stored in the memory; and
        in response to determining that the particular condition is satisfied, transmit the remote screen data to the requesting apparatus without displaying the approval screen on the user interface.

6. The image forming apparatus according to claim 5, wherein the controller is configured to:
    in response to receiving an operation relating to the particular condition via the user interface, store, in the memory, the setting information relating to the particular condition based on the operation received via the user interface.

7. The image forming apparatus according to claim 5, further comprising a Web server,
    wherein the controller is configured to:
        in response to receiving a display request for a registration page from an apparatus connected via the communication interface, transmit Web page data for displaying the registration page to the apparatus having transmitted the display request for the registration page, the registration page being a Web page for receiving an operation relating to the particular condition; and
        in response to receiving, via the communication interface, the operation relating to the particular condition from the apparatus having transmitted the display request for the registration page, store the setting information relating to the particular condition based on the operation relating to the particular condition, a process of storing the setting information relating to the particular condition requiring administrator authentication.

8. The image forming apparatus according to claim 1, wherein the controller is configured to:
    in response to determining that a communication address satisfies the particular condition when the first request is received from the requesting apparatus via the communication interface, transmit the remote screen data to the requesting apparatus without displaying the approval screen on the user interface, the communication address being an address used for communication with the requesting apparatus.

9. The image forming apparatus according to claim 8, wherein the controller is configured to:
   in the approval process, use an IP address of the image forming apparatus as the communication address; and
   in response to determining that the IP address of the image forming apparatus is a private IP address, determine that the particular condition is satisfied.

10. The image forming apparatus according to claim 8, wherein a memory of the image forming apparatus is configured to store an IP address of a permission target of the approval process; and
   wherein the controller is configured to:
      in the approval process, use an IP address of the requesting apparatus as the communication address; and
      in response to determining that the IP address of the requesting apparatus matches the IP address of the permission target stored in the memory, determine that the particular condition is satisfied.

11. The image forming apparatus according to claim 8, wherein the controller is configured to:
   in the approval process, use an IP address of the image forming apparatus and an IP address of the requesting apparatus as the communication address; and
   in response to determining that the IP address of the image forming apparatus and the IP address of the requesting apparatus are addresses on a same LAN, determine that the particular condition is satisfied.

12. The image forming apparatus according to claim 1, wherein the approval process includes:
   a first approval process of, in response to determining that a communication address satisfies the particular condition, approving display of the remote screen for the requesting apparatus without displaying the approval screen on the user interface, the communication address being an address used for communication with the requesting apparatus; and
   a second approval process of, in response to receiving the approval operation to the approval screen via the user interface, approving the display of the remote screen; and
   wherein the controller is configured to:
      perform a setting for the image forming apparatus based on an operation received via the user interface, the setting relating to whether to enable or disable the first approval process; and
      in response to receiving the first request from the requesting apparatus and to determining that the first approval process is disabled, perform the second approval process as the approval process.

13. The image forming apparatus according to claim 1, further comprising a Web server,
   wherein the approval process includes:
      a first approval process of, in response to determining that a communication address satisfies the particular condition, approving display of the remote screen for the requesting apparatus without displaying the approval screen on the user interface, the communication address being an address used for communication with the requesting apparatus; and
      a second approval process of, in response to receiving the approval operation to the approval screen via the user interface, approving the display of the remote screen; and
   wherein the controller is configured to:
      in response to receiving a display request for a Web page relating to the approval process from an apparatus connected via the communication interface, control the Web server to transmit Web page data to the apparatus having transmitted the display request, the Web page data being data for displaying a Web page on the apparatus having transmitted the display request, the Web page indicating a screen for receiving an operation of setting whether to enable or disable the first approval process;
      after transmitting the Web page data, perform a setting for the image forming apparatus based on a setting instruction from the apparatus having transmitted the display request, the setting relating to whether to enable or disable the first approval process; and
      in response to receiving the first request from the requesting apparatus and to determining that the first approval process is disabled, perform the second approval process as the approval process.

* * * * *